1405X
C. Hall.
Diving Dress.
Patented Dec. 24, 1810.
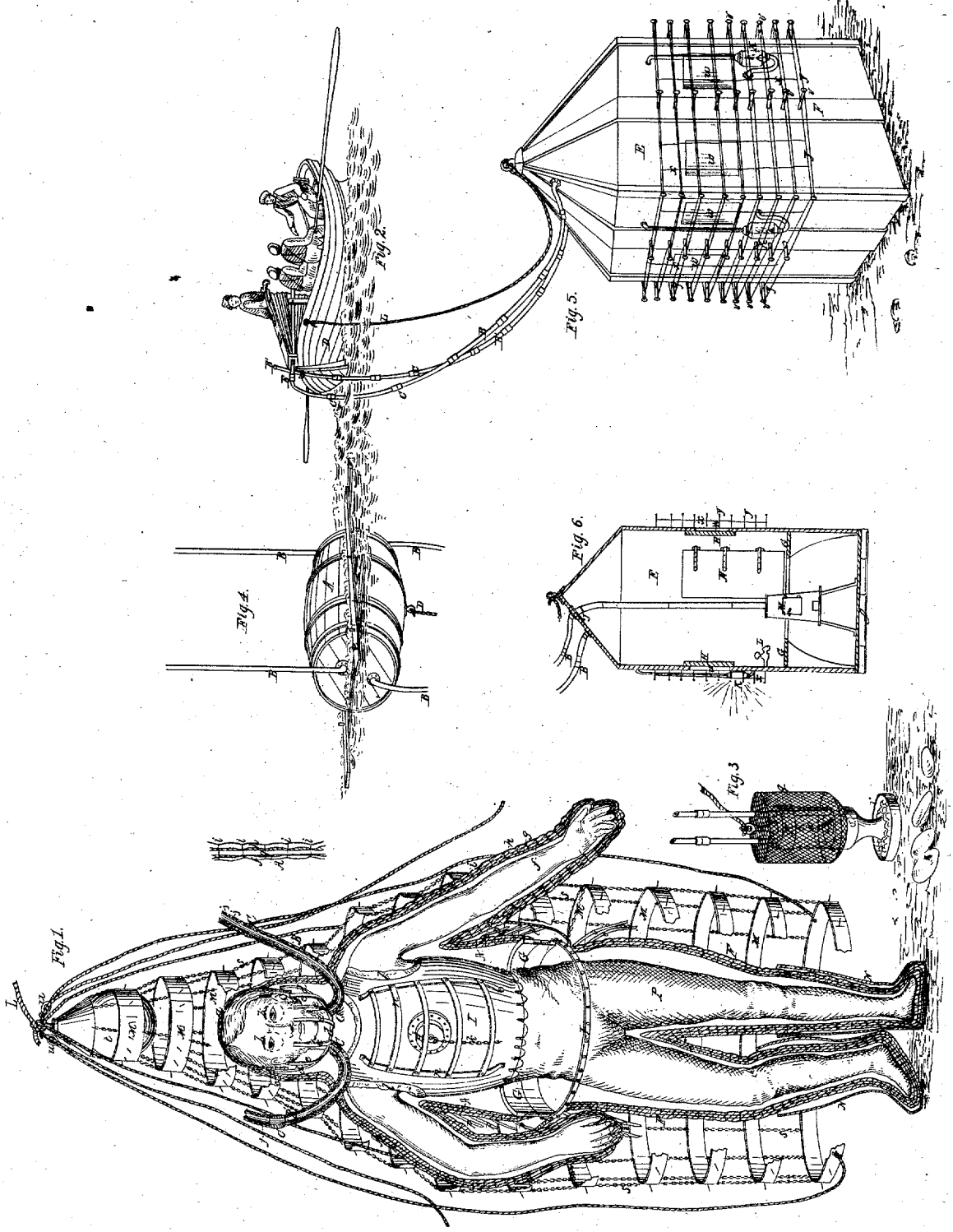
THE GRAPHIC CO. PHOTO-LITH. 39 & 41 PARK PLACE, N.Y.

Dec 24 1810 41

Chauncy Hall
Letters Patent

1405X

The schedule referred to in these Letters Patent & making part of the same, containing a description in the words of the said Chauncy Hall himself of his diving dress — to work in company with a boat or alone —

---

Diving dress to work in company with a boat — make a cap of oiled cloth then over it put one made of stiff leather to come down over the ears and almost to the tip of the nose, set in it against the eyes two glasses like spectacles then make a stout band of copper to go around the cap, and to be put in the inside, and fastened to the cap near the rim, then from one temple to the other let a stiff bow proceed out three inches more or less, then down and out from the under jaw bone and from the bow against the nose and cheeks let a number of cross bars to proceed three inches from the face to the bow under the chin and be fastened at each end. Then make a dress or frock of oil cloth to extend from the cap to the waist and the sleeves to extend to the elbows, or to a full handed glove, then make another over that of the same dimensions, but of stout oil cloth or tarpolen, then put another over them of the same dimensions, but of soft leather well stuffed with oil then stitch or quilt them together, filling the space between the stout oil cloth and leather with a composition of stiff oil, say tallow or lard or tar then stitch or close them over the bows to the cap, then make two tubes of oil cloth of two inches in diameter more or less, then put on another over that of stout oil cloth or tarpolen, somewhat larger in diameter, then between these put rings one inch apart more or less the rings to be made of copper or pewter, and to be stitched or fastened to their place, then cover it with soft leather well stuffed with oil; then fill the space between the stout oil and leather with stiff oil or tar, the first length of tubes to be twelve inches, then let one end of them enter and be closed to the dress at two or three inches below the chin, at the right hand and the other tube to enter the dress and be closed to it at the same distance at the left hand, the other ends of the tubes to be fastened, to one half of a screw, that shall be hollow so as not to contract the tube, then by the above directions make another length of tubes six feet more or less in length, then fasten one end of them to the half screws left of the first length, then fasten the other ends to the half screws like the first length, then by the directions of the last length make as many lengths as may be required, then by the same directions make a set of tubes of one inch in diameter or less, then add a sufficient number of these lengths together that may re
to a boat, then fasten the end of one of the tubes to the pipe of a double pair of bellows the o
tube to be open, to the air, then let the end of one of those small tubes enter the large tub
near the pipe of the bellows the other tube to be open to the air then make a pair of pantaloon
feet like stockings, the pantaloons to be made of the same materials as the dress and to be m
whole then fasten the waist band to the half of a stout screw to be made like the screws in t
tubes but to be large enough that a man may go through it, then fasten the lower part or sh
of the dress to the other half of the screw then make a tube of three inches diameter and two
length let it come out of the dress against the brest then screw a cover on to it with a
staple in the middle, then with a small chain fasten it to a staple in the big screw, then
a vest of stout soft leather that may reach six inches more or less below the arms, th
fasten to it a plate of copper of nearly the same dimensions every way, and to have a number o
staples at the bottom, this to be put around the body and over the shoulders and to be fasten
the back with straps and buckles, then from the plate two inches more or less, to the right of
pit of the stomack fasten a stout bow that may rise three inches more or less above the plate..
to be fastened to the plate against or near the collar bone and another of like demension to b
tened at the same direction on the left side then fasten a number of bars from one bow to
other, then make a stout hoop with a number of staples in it of copper almost as large in
ameter as the large screw on the pantaloons then stitch, fasten two rows of stout straps to the pant
a little below the screw, then fasten four rows of straps round the dress the first row to be thr
inches below the arms and the lower row to the near the screw, then make a stout lamp th
may be screwed together at or near the middle, then make a stout wire nett and let it
three inches from the lamp, fasten the top part of the lamp into the net then let one leng
the small tubes enter through the net and into the top of the lamp and be fastened to the
of the lamp, one tube on one side and the other tube on the other side then put weig
into the bottom part of the lamp sufficient to sink it to a level with the water then t
a stout piece of riggin twelve or eighteen inches shorter than the whole length of tubes
and let the riggin or rope have a stout hook fastened to it about twelve or eighteen i
above the cap of the dress and then to be fastened to the boat, then make a number of copp
hoops with spikes at the outside two or three inches apart and six inches in length more
less the first hoop to be eight inches more or less in diameter the next hoop to be larg
and so to increase into three feet more or less in diameter the hoops to be fastened to
with links or chains about three inches more or less a part and to extend from twelve eighteen inches above the cap down to the feet then make a pair of boots of copper with joints
at the ancles then put on a flannel shirt without sleeves, then put on the vest, that is mead
of leather with the plate or copper fastened to it and have it buckled at the back then put on
a pair of buckskin pantaloons with feet to them, let them come up to the vest and be fastened
to the plate of copper, then put on the first named pantaloons, then fasten the large the large
hoop to it with the straps that are below the screw, then screw together such length of tubes as
may be required then fasten the hoop to those hoops that are chained together: then put in the
Top a glove of air sufficient to buoy it up, then fasten two or more blocks to the hook then
put small cords through the blocks and fasten them to the lower-most hoop, then fasten two cords
to the hook and fasten them to the hoop round the weast then put on the dress and screw
it fast to the pantaloons, then screw of the cap, of the tube at the brest then make a bandage
two or three inches in wedth of oil cloth and wind it three or more times around the arms
above the elbows into the sleves of the dress, then with another bandage bind the sleeves of the
dress tight into the first bands above the elbows, then set down the cap and tie the first
and second and the third and fouth row of straps together then put a stout pair of sus-
penders on the shoulders and fasten them to the hoop on the pantaloons then to fasten the
two cords to the hoop. then fasten bags of sand sufficient to sink the whole to the hoop, then
screw on the tubes into the dress screw first that one that is fastened to the belows and let them
be put in motion then screw on the other tube. Then screw on the cap, to the short tube at the
brest. then light the lamp and screw it to the Top, then put on the boots made of copper and
Take a harpoon in hand and launch off, with a slack rope by it rise or sink at pleasure ..
.. A dress to worke alone to be made like the one before mentioned except instead of those
tubes extending to the boat and bellows they must be made fast to stout copper tubes of
ten or Twelve feet in length and those copper tubes to go through a buoy and fastened to it,
say a hogshead and those copper Tubes to go Through both heads and extend six or eight
feet above the hogshead, then fasten the heads of the hogshead tight around the tubes to be
settled with ballas; say two thirds of her depth in the water, then that it may in no wise
turn over fasten plank across each other. say six feet more or less in length and then fasten
them to the hogshead, then take a pair of bellows like hand bellows under the dress then all
the straps in the dress to be let loose the bellows to be put under the right arm the clapper
to be in the side towards the left hand and the pipe to be fastened into the tube on the
right side then fasten the tube tight to the pipe of the bellows then instead of the small tubes
extending to the top of the water to support the lamp. one of them must enter the large tube three or four inches above the pipe of the bellows and the other tube to enter the sam
three or four inches above, that then the bellows to be moved by the hand or arm to circul
the air, but the rope to support the hoops, must be shorter than the tubes and fastened
staple at the bottom of the hogshead Then a slack rope to be fastened to the hogshead to g
in comeing to it or instead of a hogshead take a small boat and launch off if the r
and screws are not sufficient to sink the tubes full of air then fasten around the out
of the Tubes thick heavy plates of lead six inches more or less a part that will sink
tubes to a ballance with the water - To make discovery in, make a box six feet mor
less square or round and in height eight feet or more and to come to a point of the
then make a large staple or ring bolt, and from it extend four or more plates or bars
iron that will reach to the bottom of the box, then fasten them firm to the box, Then f
those plates, extend stout staples or ring bolts six or eight inches or more and three in
a part on the plates then between these plates set as many panes of thick strong glass
fancy may direct into the sides of the box, then to secure them make a netting of st
wire and fasten it to the bolts three or four inches from the box, then make stout hoops
iron and put through these ring bolts at the ends and let them go round the box, th
rivet stout bars up and down the box to have a door sufficient to take a man in, T
make the Tubes of copper with joints so that it may bend the tubes to be of any length
let them enter the box a little below the top and be fastened to it then let them exten
a boat and one end of them to be fastened to the pipe of a double bellows, the other tub
be open to the air then take a rope and fasten it to the ring bolt at the Top of the b
the rope to be three feet shorter than the tubes, the other end to be made fast to a st
staple in the boat, then make a seat around the inside of the box it must be made
then make stout shetters and hang them with buts to cover every pane of glass, then
a sliding shutter to cover the Tube that lets the air out then fasten to the bottom of
box a weight sufficient to sink it and one hundred weight more, then fix a runni
riggin to the staple at the top of the box that it may be let down or raised at pleas
Then take as many small tubes and lamps to be secured within the bars of iron on
outside of the box then as many as may be convenient may go into the box then b
a hole through the side of the box and put in a brass cock, then set a small stove
the box and let the pipe enter the tube that lets out the air, Then build a fire in t
stove and let the man begin to move the bellows, then light the lamp and shut
door and should the stove smoak partly close the tube upon the pipe then launch into the depth under contemplation. To circulate air into wells that are possessed of
damp or where it is necessary to burn powder and work, make a single tube of oil cloth or
leather fasten one end to the pipe of a bellows and let the other end go to the bottom of the well
then put the bellows in motion. For mines build a wall at the entrance and enter by a door
then make a tube of copper or iron and fasten one end to a pair of bellows and convey the
other end through the wall, to the middle or any part of the place, then set a stove at
the farthest part of the mine and let the pipe extend through the wall to the open air, then
build a fire in the stove and set the bellows in motion and the air will circulate and pass
out through the pipe of the stove and carry all the smoke with it and the laborer will
have the benefit of both the fire and a pure air.

Witnesses
Saml. J. Coolridge
John Welder

Chauncy Hall

Cop'd
W.G.

Drawing made
[illegible]

2780 words